(12) United States Patent
Holt

(10) Patent No.: US 9,830,448 B2
(45) Date of Patent: Nov. 28, 2017

(54) ENHANCED SECURITY FOR JAVA VIRTUAL MACHINES

(71) Applicant: Waratek Limited, Dublin (IE)

(72) Inventor: John Matthew Holt, Dublin (IE)

(73) Assignee: Waratek Limited (IE)

( * ) Notice: Subject to any disclaimer, the term of this patent is extended or adjusted under 35 U.S.C. 154(b) by 89 days.

(21) Appl. No.: 14/747,122

(22) Filed: Jun. 23, 2015

(65) Prior Publication Data

US 2016/0019385 A1    Jan. 21, 2016

Related U.S. Application Data

(60) Provisional application No. 62/015,797, filed on Jun. 23, 2014.

(51) Int. Cl.
*G06F 21/53* (2013.01)
*G06F 9/455* (2006.01)
*G06F 9/44* (2006.01)

(52) U.S. Cl.
CPC ............ *G06F 21/53* (2013.01); *G06F 9/4425* (2013.01); *G06F 9/45504* (2013.01); *G06F 9/45558* (2013.01); *G06F 2009/45587* (2013.01); *G06F 2221/033* (2013.01); *G06F 2221/2101* (2013.01)

(58) Field of Classification Search
CPC .... G06F 21/53; G06F 9/45558; G06F 9/4425; G06F 9/45504; G06F 2009/45587; G06F 2221/2101; G06F 2221/033
USPC .......................................................... 726/22
See application file for complete search history.

(56) References Cited

U.S. PATENT DOCUMENTS

| | | | |
|---|---|---|---|
| 8,090,797 B2* | 1/2012 | Chinta | G06F 21/53 709/203 |
| 2007/0171921 A1* | 7/2007 | Wookey | G06F 3/1415 370/401 |
| 2009/0204964 A1* | 8/2009 | Foley | G06F 21/53 718/1 |
| 2012/0317563 A1* | 12/2012 | Arcese | G06F 11/1004 717/170 |

(Continued)

*Primary Examiner* — Kambiz Zand
*Assistant Examiner* — Benjamin Kaplan
(74) *Attorney, Agent, or Firm* — Design IP

(57) ABSTRACT

A computer architecture providing enhanced JVM security and a method of providing enhanced security for a JVM are disclosed. The host computer runs a single, first, trusted JAVA API library above which is located a hypervisor software layer, and then at least one untrusted JAVA API library. The code of each second, upper, untrusted JAVA API library is modified at, or before runtime to call the hypervisor software layer instead of the JVM to thereby create a silo corresponding to each of the second, upper, untrusted JAVA API libraries. Each silo extends between the host computer and the corresponding second, upper, untrusted JAVA API library. The hypervisor software layer is operated to only permit communication between each of the second, upper, untrusted JAVA API libraries and a corresponding portion of the memory and functional assets of the host computer. Consequently, each of the second, upper, untrusted JAVA API libraries cannot communicate with all of the host computer memory and/or all of the host computer functional assets. A computer program product is also disclosed.

9 Claims, 4 Drawing Sheets

(56) References Cited

U.S. PATENT DOCUMENTS

2013/0132690 A1* 5/2013 Epstein ............... G06F 12/1416
711/159

* cited by examiner

ENHANCED SECURITY FOR JAVA VIRTUAL MACHINES

FIELD OF THE INVENTION

The present invention relates to computer programs written in the JAVA language.

BACKGROUND ART

When the Java Platform was original designed it was conceived to be a secure operating environment for untrusted applications, allowing a user to operate applications from untrusted third parties in a quarantined sandbox environment. However, over the years the Java Platform has gained a contrary reputation, as one of the most insecure and vulnerable software environments in the world.

The Java Platform today is very different from the time of its inception. The Java Platform is today in its 9th major release (Java SE 8), and can comprise up to 5 million lines of source-code. The volume of source-code in the Java Platform—far more than other similar platforms—has at least in part contributed to the poor security profile and frequent vulnerability discoveries of recent years. Such a large source-code-base is beyond the ability of any one programmer to reason about secure and insecure operations, and this has in turn led to new vulnerabilities and exploitable weaknesses which arise from the unintended consequences of "code-bloat".

At the root of Java's security problems is the security model designed into the Java Platform—called the "Java Security Architecture". The original security model provided by the Java Platform is known as the sandbox model, which existed in order to provide a very restricted environment in which to run untrusted code obtained from the open network. The essence of the sandbox model is that local code is trusted to have full access to vital system resources (such as the file and memory systems) while downloaded remote code (an applet) is not trusted and can access only the limited resources provided inside the sandbox. This sandbox model is schematically illustrated in FIG. 1.

As seen in FIG. 1, the JAVA API class library includes for example an "access function" F which is for accessing valuable resources of the host computer. The access function is responsible for determining whether access to a valuable resource is guarded by some security policy, and if so, to consult the java.lang.SecurityManager class to vet such calls and either allow or disallow them. However, in practice, it is fairly easy to manipulate the access function F to bypass the SecurityManager checks and proceed without SecurityManager policy in effect. The effect of such an attack is that the security manager is effectively bypassed or nullified, and so the SecurityManager fails to reliably undertake the security control role it is expected to perform.

In this prior art scheme, the design flaw from which the poor security controls arise, is that the SecurityManager class, which is where the security control policy is implemented and applied, is only used in an "advising" capacity by access function F. In otherwords, access function F queries the SecurityManager class whether access function F is permitted to operate, and the SecurityManager class returns an indication of whether access is allowed or not. Thus, the SecurityManager serves a purely advisory role to access function F, and is not capable of directly controlling the operation of access function F, and therefore is not able to directly control operations performed upon valuable resources. As a result, a bug or discrepancy in the code or behaviour of access function F—or contextual manipulation by an Application class—can cause access function F to omit to consult the SecurityManager class, and so proceed to allow unsafe access to a valuable resource.

In this security model, an Application Class such as a "ClassLoader" class defines a local name space, which can be used to ensure that an untrusted applet cannot interfere with the running of other programs. Access to crucial system resources was intended to be mediated by a "SecurityManager" class, in combination with "ClassLoader" classes, to restrict the actions of a piece of untrusted code to the bare minimum.

What was significant in this software design, was that the security-enforcement capability—the "SecurityManager" class and one or more "ClassLoader" classes—were implemented side-by-side with the application code these classes were intending to mediate. In other words, these classes ran inside the same sandbox as the untrusted application classes, and used the same Java Platform Application Programming Interfaces (API's) as the untrusted classes.

The consequence of this security design, has been the emergence of a large number of discovered vulnerabilities where application classes, operating side-by-side with the security-enforcing SecurityManager class, can bypass the security control facilities of the SecurityManager class to do any of: (i) uninstall the SecurityManager, (ii) replace the SecurityManager, (iii) undertake operations or actions that the SecurityManager believes are from itself or it's associated 'trusted' code, or (iv) undertake operations or actions that the SecurityManager is unaware are taking place Thus, the Java Security Architecture—relying on the SecurityManager class facility—is not able to reliably ensure that an application, and/or the Java API class library on which the application operates, do not undertake undesirable actions that an administrator might want to control or restrict, such as for example denying the application and Java API class library from reading a file of a specified directory. Due to the design flaws of the Java Security Architecture, it is possible to bypass or circumvent the SecurityManager controls and thereby break out of the security controls sought to be enforced by the application administrator.

For several examples of vulnerabilities and weaknesses in one or more versions of the Java API classlibrary where the SecurityManager control checks can be bypassed, circumvented, skipped, or removed altogether see http://www.security-explorations.com/materials/se-2012-01-report.pdf.

This "sandbox" security model is very different from the security model used—and long established—in operating systems. Almost all commercial operating systems rely on "protection rings" to enforce security. FIG. 2 illustrates a typical prior art security ring arrangement.

In this security model, a "ring" is a layer of privilege within the software architecture. Rings R0, R1, R2, . . . etc. are arranged in a hierarchy from most privileged (most trusted, usually numbered zero), to least privileged (least trusted, usually with the highest ring number). On most operating systems "ring 0" is the level with the most privileges and interacts most directly with the physical hardware such as the CPU and memory.

Importantly, a strict and formally defined interface (sometimes called "a gate") such as G0, and G1 between rings is provided to allow an outer-ring to access an inner ring's resources in a predefined manner, as opposed to allowing arbitrary usage. Thus, an outer (less privileged) ring can only access valuable resources by requesting an inner ring to perform the sought action on the outer ring's behalf. This means that inner rings act as mediating proxies for value resources on behalf of outer rings, and that outer rings do not have direct access to valuable resources or the operations that can be applied directly to outer resources. Correctly gating access between rings improves security by preventing programs from one ring or privilege level from misusing resources intended for programs in another.

More recently, with the emergence of x86 hypervisors like VMware and Xen, there has been a renewed interest in this "protection ring" structure. In a hypervisor platform, different operating system "guests" operate inside less-privileged rings, which can only interact with the physical computer's resources through the defined interface ("gate") that the hypervisor exports. The hypervisor thus serves as a proxy for the valuable physical computer resources, and therefore can reliably mediate safe and secure access to these valuable resources which cannot be accessed directly by untrusted "guest" software.

Extending this concept further, hypervisor developers used the protection rings and the formal "gated" interface that they defined, to implement emulation facilities for functions which were either too insecure or untrusted to occur on the real physical server. Examples of this are interacting with network interfaces and storage controllers.

A frequently used term to describe the most privileged ring is "supervisor mode".

Unfortunately, the way the Java Platform and its components (specifically the Java API class libraries, and the Java Virtual Machine, or JVM) are implemented mean that Java does not operate with privilege rings, and so does not operate with mediating proxies that can control and enforce the safe use of valuable resources. Instead, Java application classes, as well as any of the Java API class libraries, can directly call privileged "native" methods inside the JVM or OS libraries that access valuable resources directly and in an uncontrolled manner, and the only opportunity to enforce security controls is in the advisory check of the SecurityManager class by the Java API class libraries. As a result, it has been considered impossible to introduce "protection rings" into the Java Platform without breaking binary compatibility with existing Java applications that have been written.

GENESIS OF THE INVENTION

The genesis of the present invention is a desire to improve the security of operation of computer programs written in the Java language while still maintaining compatibility with third-party Java applications.

The present invention is further directed to operating unsafe or "known-vulnerable" Java API class libraries in a secure and quarantined manner.

SUMMARY OF THE INVENTION

In accordance with a first aspect of the present invention there is disclosed a method of operating one or more untrusted application programs on a JAVA virtual machine (JVM) in an enhanced security mode, said JAVA virtual machine comprising a host computer having a memory and functional assets onto which is installed a JVM layer and a single, first, lower, trusted JAVA Application Programming Interface (API) library, said method comprising the steps of running a hypervisor software layer on said first, lower, trusted JAVA API library and running at least one second, upper, untrusted JAVA API library on said hypervisor software layer, at or before runtime, modifying the code of each said second, upper, untrusted JAVA API library to call said hypervisor software layer instead of said JVM to thereby create a silo corresponding to each of said second, upper, untrusted JAVA API libraries, each said silo extending between said host computer and the corresponding second, upper, untrusted JAVA API library; and operating said hypervisor software layer to only permit communication between each of said second, upper, untrusted JAVA API libraries and a corresponding portion of the memory and functional assets of said host computer, whereby each of said second, upper, untrusted JAVA API libraries cannot communicate with all of said host computer memory and/or all of said host computer functional assets.

In accordance with a second aspect of the present invention there is disclosed a computer architecture to be hosted by a host computer having memory and functional assets to form a JAVA Virtual Machine having enhanced security, said computer architecture comprising a single, first, trusted JAVA Application Program Interface (API) library above a JVM, a hypervisor software layer above said first trusted JAVA API library, and at least one second, untrusted JAVA API library on said hypervisor layer, the code of each said second, upper, untrusted JAVA API library being modified at or before runtime to call said hypervisor software layer instead of said JVM to thereby create a silo corresponding to each of said second, upper, untrusted JAVA API libraries, each said silo extending between said host computer and the corresponding second, upper, untrusted JAVA API library; wherein said hypervisor software layer only permits communication between each of said second, upper, untrusted JAVA API libraries and a corresponding portion of said memory and functional assets of said host computer, and wherein each of said second, upper, untrusted JAVA API libraries cannot communicate with all of said host computer memory and/or all of said host computer functional assets.

According to another aspect of the present invention there is provided a physical computer program product comprising a computer program which, when loaded and run on a host computer, produces a JAVA Virtual Machine having the computer architecture as described above or providing enhanced security in accordance with the method as described above.

BRIEF DESCRIPTION OF THE DRAWINGS

A preferred embodiment of the invention will now be described, by way of example only, with reference to the accompanying drawings in which.

DETAILED DESCRIPTION

Figure 1:
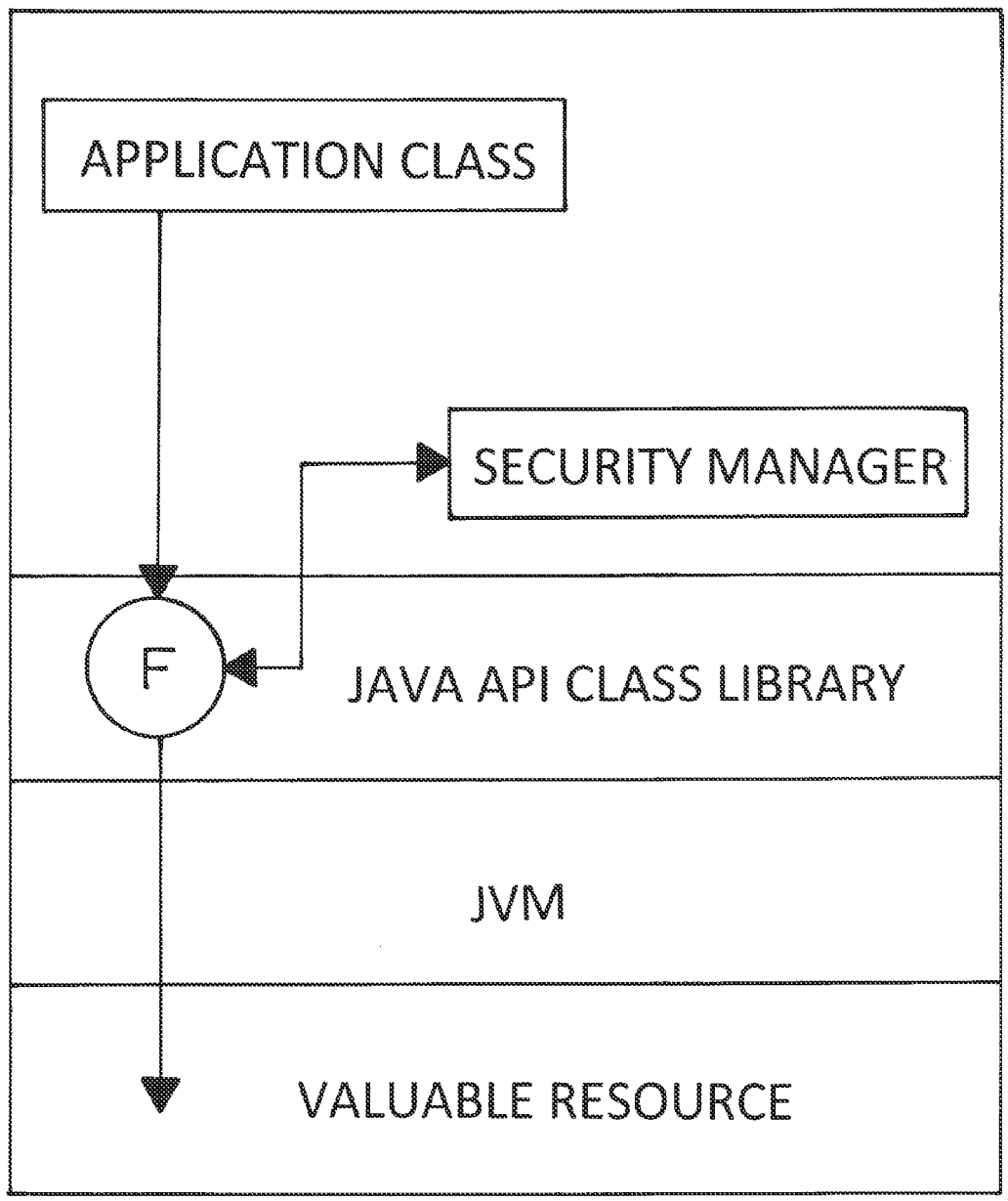
FIG. 1 is a schematic representation of a prior art sandbox arrangement, b.
Figure 2:
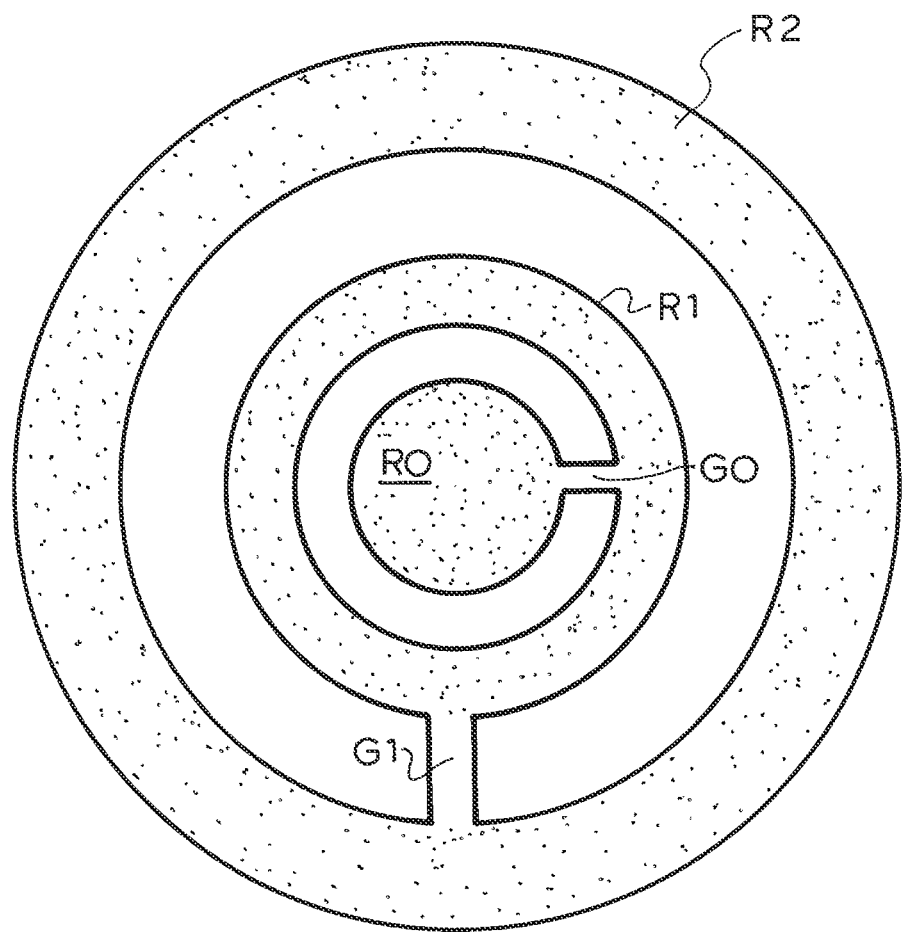
FIG. 2 is a schematic representation of a prior art security ring arrangement, c.

The preferred embodiment of the present invention describes a method to address the above described limitation of the Java Platform, and so allow "protection rings" to be applied to the Java Platform in a way that is binary compatible with third party Java applications. Binary compatibility means that such third-party Java applications are operable without any change being required to their source code. This method is achieved by running an upper Java API class library, on top of a hypervisor-like software layer running on top of a lower Java class library, on top of one single JVM.

The Java Platform is made up of two major software components: the Java API class-libraries, and the Java Virtual Machine. In a normal Java environment these two software components are tightly integrated together, and decoupling them is not possible.

The Java API class libraries comprise a set of files, divided into "official packages" which for the Java SE 6 version are the following:

java.applet
java.awt
java.awt.color
java.awt.datatransfer
java.awt.dnd
java.awt.event
java.awt.font
java.awt.geom
java.awt.im
java.awt.im.spi
java.awt.image
java.awt.image.renderable
java.awt.print
java.beans
java.beans.beancontext
java.io
java.lang
java.lang.annotation
java.lang.instrument
java.lang.management
java.lang.ref
java.lang.reflect
java.math
java.net
java.nio
java.nio.channels
java.nio.channels.spi
java.nio.charset
java.nio.charset.spi
java.rmi
java.rmi.activation
java.rmi.dgc
java.rmi.registry
java.rmi.server
java.security
java.security.acl
java.security.cert
java.security.interfaces
java.security.spec
java.sql
java.text
java.text.spi
java.util
java.util.concurrent
java.util.concurrent.atomic
java.util.concurrent.locks
java.util.jar
java.util.logging
java.util.prefs
java.util.regex
java.util.spi
java.util.zip
javax.accessibility
javax.activation
javax.activity
javax.annotation
javax.annotation.processing
javax.crypto
javax.crypto.interfaces
javax.crypto.spec
javax.imageio
javax.imageio.event
javax.imageio.metadata
javax.imageio.plugins.bmp
javax.imageio.plugins.jpeg
javax.imageio.spi
javax.imageio.stream
javax.jws
javax.jws.soap
javax.lang.model
javax.lang.model.element
javax.lang.model.type
javax.lang.model.util
javax.management
javax.management.loading
javax.management.modelmbean
javax.management.monitor
javax.management.openmbean
javax.management.relation
javax.management.remote
javax.management.remote.rmi
javax.management.timer
javax.naming
javax.naming.directory
javax.naming.event
javax.naming.ldap
javax.naming.spi
javax.net
javax.net.ssl
javax.print
javax.print.attribute
javax.print.attribute.standard
javax.print.event
javax.rmi
javax.rmi.CORBA
javax.rmi.ssl
javax.script
javax.security.auth
javax.security.auth.callback
javax.security.auth.kerberos
javax.security.auth.login
javax.security.auth.spi
javax.security.auth.x500
javax.security.cert
javax.security.sasl
javax.sound.midi
javax.sound.midi.spi
javax.sound.sampled
javax.sound.sampled.spi
javax.sql
javax.sql.rowset
javax.sql.rowset.serial
javax.sql.rowset.spi
javax.swing
javax.swing.border
javax.swing.colorchooser
javax.swing.event
javax.swing.filechooser
javax.swing.plaf
javax.swing.plaf.basic
javax.swing.plaf.metal
javax.swing.plaf.multi javax.swing.plaf.synth
javax.swing.table
javax.swing.text
javax.swing.text.html
javax.swing.text.html.parser
javax.swing.text.rtf
javax.swing.tree
javax.swing.undo
javax.tools
javax.transaction
javax.transaction.xa
javax.xml
javax.xml.bind
javax.xml.bind.annotation
javax.xml.bind.annotation.adapters
javax.xml.bind.attachment
javax.xml.bind.helpers
javax.xml.bind.util
javax.xml.crypto
javax.xml.crypto.dom
javax.xml.crypto.dsig
javax.xml.crypto.dsig.dom
javax.xml.crypto.dsig.keyinfo
javax.xml.crypto.dsig.spec
javax.xml.datatype
javax.xml.namespace
javax.xml.parsers
javax.xml.soap
javax.xml.stream
javax.xml.stream.events
javax.xml.stream.util
javax.xml.transform
javax.xml.transform.dom
javax.xml.transform.sax
javax.xml.transform.stax
javax.xml.transform.stream
javax.xml.validation
javax.xml.ws
javax.xml.ws.handler
javax.xml.ws.handler.soap
javax.xml.ws.http
javax.xml.ws.soap
javax.xml.ws.spi
javax.xml.ws.wsaddressing
javax.xml.xpath
org.ietf.jgss
org.omg.CORBA
org.omg.CORBA_2_3
org.omg.CORBA_2_3.portable
org.omg.CORBA.DynAnyPackage
org.omg.CORBA.ORBPackage
org.omg.CORBA.portable
org.omg.CORBA.TypeCodePackage
org.omg.CosNaming
org.omg.CosNaming.NamingContextExtPackage
org.omg.CosNaming.NamingContextPackage
org.omg.Dynamic
org.omg.DynamicAny
org.omg.DynamicAny.DynAnyFactoryPackage
org.omg.DynamicAny.DynAnyPackage
org.omg.IOP
org.omg.IOP.CodecFactoryPackage
org.omg.IOP.CodecPackage
org.omg.Messaging
org.omg.PortableInterceptor
org.omg.PortableInterceptor.ORBInitInfoPackage
org.omg.PortableServer
org.omg.PortableServer.CurrentPackage
org.omg.PortableServer.POAManagerPackage
org.omg.PortableServer.POAPackage
org.omg.PortableServer.portable
org.omg.PortableServer.ServantLocatorPackage
org.omg.SendingContext
org.omg.stub.java.rmi
org.w3c.dom
org.w3c.dom.bootstrap
org.w3c.dom.events
org.w3c.dom.ls
org.xml.sax
org.xml.sax.ext
org.xml.sax.helpers In addition to the "official packages" of the Java API class libraries, various other "unofficial packages" might also be present in a vendor's implementation of the Java API class libraries specification. Examples of such other "unofficial packages" which may be present in an implementation of the Java API class libraries are:

sun.misc
sun.net
sun.nio
sunw.io
sunw.util
com.sun.java
com.sun.image
com.sun.management
com.oracle.net In practice, only a small number of classes from these packages make calls out to the JVM or to the operating system (OS) libraries underneath the Java API class libraries. These classes represent a sort of "unofficial" "gate interface" between the Java API class library, and the JVM on which it runs. The exact composition of this "gate interface" list of classes will vary from JVM to JVM, and from version to version of the Java API class library.

The preferred embodiment of the present invention introduces a "protection ring framework" for quarantining vulnerable or untrusted Java API class libraries, which allows one or more "untrusted" Java API class libraries to operate on top of a "trusted" Java API class library, on top of a single JVM. This is particularly beneficially applied when an older vulnerable and untrusted Java API class library is operated on top of a new, trusted and not vulnerable (or less vulnerable) Java API class library. This architecture is shown in FIG. 3.

Figure 3:
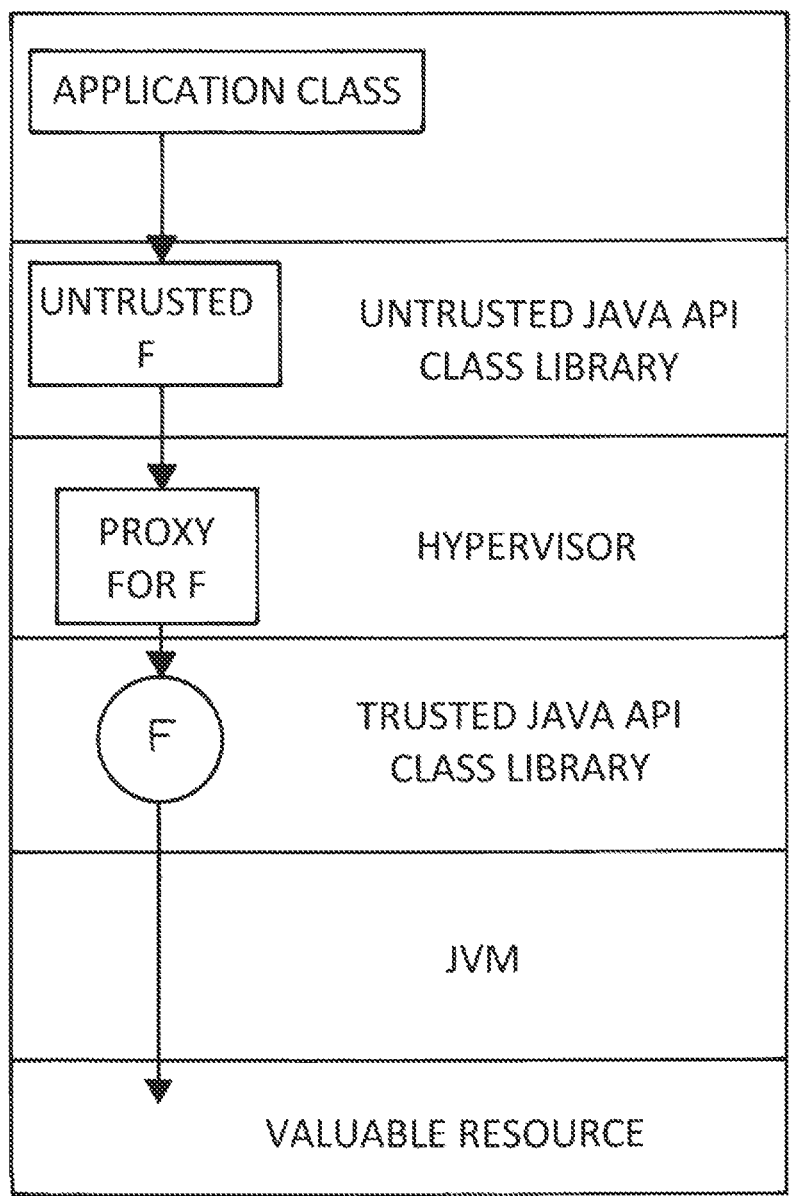
FIG. 3 is a schematic representation of the fundamental security arrangement of the preferred embodiment, and d.

As seen in FIG. 3, the trusted JAVA API class library with its access function F, the JVM and the host computer are as before and as illustrated in FIG. 1. The application class is also as illustrated in FIG. 1 but is now directed to the untrusted access function F of the "upper" untrusted JAVA API class library which in turn invokes the proxy function for F of the hypervisor software, which then invokes the trusted access function F (the "real" access function F) on behalf of the untrusted Application Class caller. This arrangement, unlike FIG. 1, cannot bypass the security controls, because the access function F called by the Application Class is no longer able to access the "real" access function F and so access the valuable resource directly, and must instead request the hypervisor software to access the valuable resource on its behalf via the Proxy Function for F. Because of this architecture, it is not possible for the security control functions of the hypervisor to be bypassed or otherwise circumvented, because only the hypervisor can invoke the "real" access function F, not the application as in FIG. 1.

This overcomes the limitation of FIG. 1 because the access function F(s) of the untrusted and potentially vulnerable class library are no longer allowed to access the value resources directly themselves (as they were previously), and must now request the hypervisor proxy function for F to make the unsafe access of the valuable resource on it's behalf- and so ensure that the security control logic is always part of the call-path and cannot be skipped or bypassed as the SecurityManager checks of FIG. 1 can be.

To achieve this architecture, a small "hypervisor-like" software layer is written, so as to run on top of the "trusted" Java API class library. The "hypervisor-like" layer preferably runs as the single/only application of the "trusted" Java API class library, and where the "hypervisor-like" layer implements a protection-ring interface (or "gate") between the trusted Java API class library on which it operates, and one or more other Java API class libraries that it will load and run on top of it. The inventor has coined the term "nested or sequential Java Runtime Environments (JREs)" for this arrangement of an upper Java API class library operating on top of a lower Java API class library, regardless of whether the two Java API class libraries are the same versions of the Java API specification(s) or not.

As the Java API class library was never written to operate in a nested or sequential configuration, the hypervisor-like software has to modify the operation of the small set of "unofficial gate interface" classes of the untrusted Java API class libraries to, instead of calling the JVM or OS libraries directly, to call the hypervisor-like software layer instead. Preferably such modification is hidden from, or invisible to, Application Class(es). Thus, the hypervisor-like software layer provides an emulation facility for the unofficial "gate" interface between the untrusted Java API class libraries and the JVM. In this way the untrusted Java API class libraries can be hosted on top of a trusted Java API class library set, with the hypervisor-layer acting as "privilege ring" boundary that mediates the actions of the untrusted Java API class libraries in a way which is not able to be circumvented, and thereby ensure the proper and robust security controls can be enforced and not bypassed.

By implementing a hypervisor-like layer for Java in this way, it becomes possible to run and operate a completely independent second, "upper", Java API class library on top of a first Java API class library, and for the second, upper, Java API class library to be constrained in its operations by the 'hypervisor' layer intermediating between the first Java API class library and the second Java API class library, thereby providing a reliable and secure sandbox environment to overcome the security limitations of the Java Platform.

Figure 4:
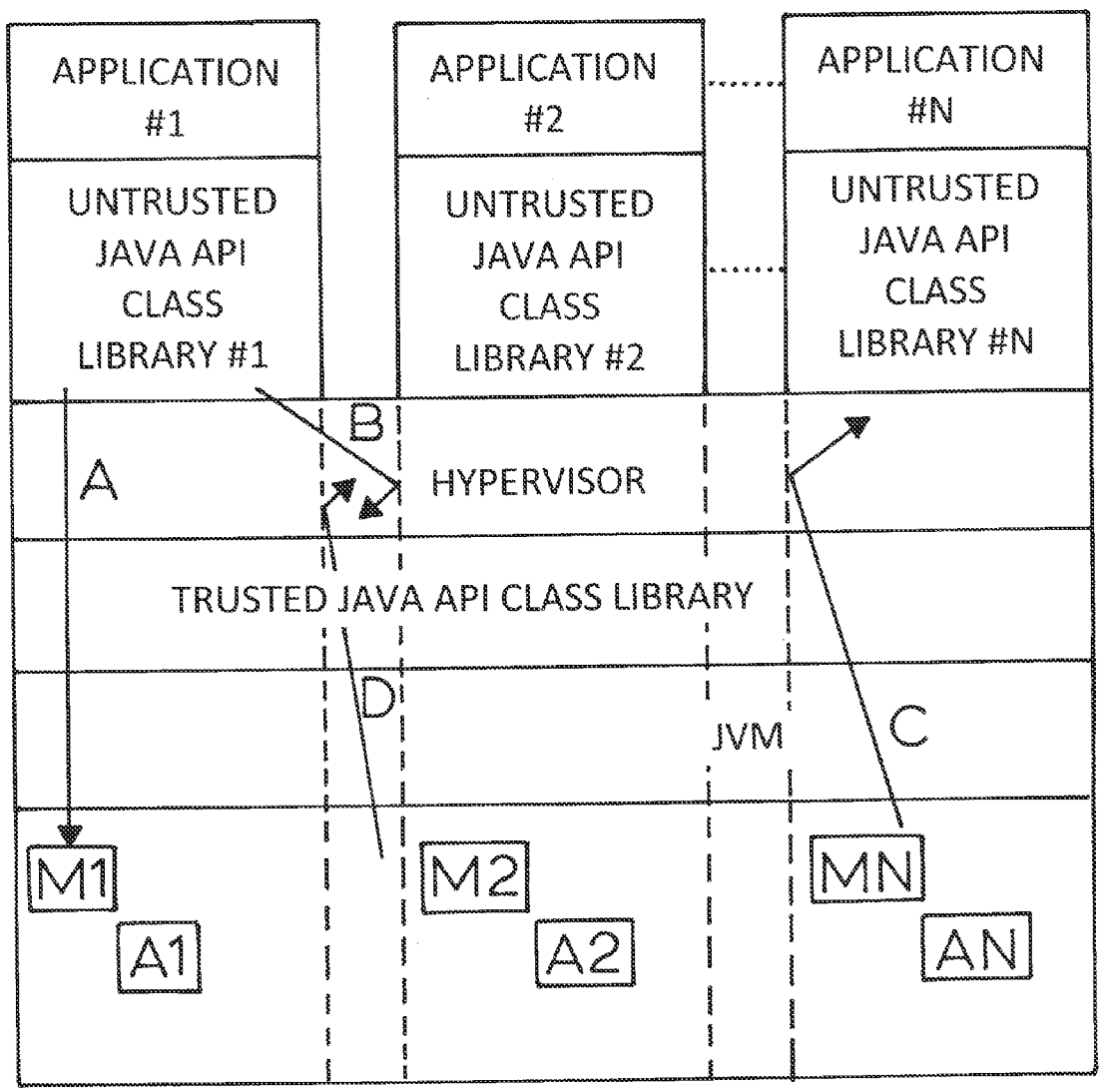
FIG. 4 is a schematic representation of the preferred embodiment operating multiple application programs on a JVM with enhanced security.

FIG. 4 schematically represents an arrangement in which enhanced security is provided for multiple applications which are simultaneously run on a Java Virtual Machine. In FIG. 4, the host machine has valuable resources in the form of memory M and functional assets A. Above the host computer is the Java Virtual Machine (JVM) and above the JVM is the single trusted JAVA API class library. Above this layer again is the Hypervisor described above. A number of individual applications #1, #2, . . . #N, each with its own corresponding untrusted JAVA API class library, sit above the Hypervisor.

As indicated by arrow A in FIG. 4, Application #1 is able to communicate via its untrusted JAVA API class library #1, the Hypervisor, and the trusted JAVA API class library with the JVM and the host computer. In particular, Application #1 is only able to access the memory M1 and functional assets A1 allocated to it by the trusted JAVA API class library with the constraints defined by the hypervisor software. Thus it will be seen that Application #1 operates within a corresponding silo having a vertical extent and a tubular characteristic. The walls of each silo are indicated by broken lines in FIG. 4.

It will be seen from arrow B in FIG. 4 that should the untrusted JAVA API class library #1 attempt to access other memories such as memory M2 which is not allocated to its silo (the first silo), then this access attempt is refused by the Hypervisor.

Similarly, as indicated by arrow C in FIG. 4, should for any reason Application #N, for example, attempt to communicate with a tenant application, such as Application #2, then this attempted communication outside of silo N is also refused by the Hypervisor.

Still further, as indicated by arrow D in FIG. 4, should the host computer be in some way infected, hacked, or otherwise be operating in a way other than as intended by its owners, then any attempt made from within the host computer or the JVM to access the contents of a silo is also refused by the Hypervisor.

The benefit of the approach described herein is that the untrusted Java API class library operates in a restricted way, where 'untrusted' Java API classes that previously could call directly to the JVM and/or OS libraries, now can only call to the hypervisor 'redirection' layer operating on the trusted Java API class library, and so can examine all requested actions made by the untrusted Java API classes independently of the untrusted Java API class library—something that the prior art Security Manager class of the Java Security Architecture of FIG. 1 is incapable of.

One embodiment of the present invention is described below for constructing a 'hypervisor'-like layer which is able to operate an untrusted Java API classlibrary on top of a trusted Java API class library, and so ensure safe and controlled operation of untrusted and/or vulnerable Java API class library(ies) in a secure manner.

The preferred embodiment utilizes a preliminary step followed by a subsequent step. Each of these steps is capable of being realised in various alternative fashions.

Preliminary Step-Native Method Redirection

In a first step to build a hypervisor-like layer for the Java SE 6 Java API class libraries, the behaviour of one or more "native" methods of one or more Java API classes, must be modified so as to not invoke Java Native Interface (JNI) functions of the JVM or of OS libraries, and instead to invoke a replacement Java function of one or more Java classes provided in the hypervisor software package for the purpose of emulating or replacing the corresponding/equivalent JAVA Native Interface function(s). In this way, the untrusted Java API classes are modified so as to no longer have the capability to access valuable resource (for example, JNI functions written in non-Java language(s) like C/C++) directly.

"Native" methods and JNI functions are part of the Java Virtual Machine Specification, where Java methods can invoke functions that are written in non-Java languages (called "native methods" or "JNI functions"), such as C or C++. To achieve this Java-to-non-Java invocation action, a Java class defines a method with a "native" modifier which corresponds to a second function written in a non-Java language and linked to the JVM as an operating-system-dependent library in accordance with the JNI framework. Such methods are called "native" methods or "JNI functions" in Java terminology, and typically represent privileged or important or "valuable" or "unsafe" operations that either cannot be performed in Java or which require special operating system support in order to undertake (examples are writing to a file, sending a network packet, etc). Thus, in order to implement a secure quarantine framework for Java applications, it is necessary to intercept and mediate access to these privileged JNI functions.

The Java API class library incorporates many "native" methods, the exact composition of which differs version to version, and which are used for performing a large range of privileged and special operations that, if misused, can represent a significant security risk.

The exact list of native methods that may be desirable to emulate or replace with the hypervisor software package may differ from one Java SE version to the next, and from one implementation to the next of the hypervisor software package developed in accordance with embodiments of this invention, but the technique described below will apply mutatis mutandis.

An incomplete example list of JNI functions that may be desirable to emulate in the hypervisor layer is as follows:

```
java.text.Bidi.nativeBidiChars( )
java.util.concurrent.atomic.AtomicLong.VMSupportsCS8( )
java.util.TimeZone.getSystemTimeZoneID( )
java.util.zip.Adler32.update( )
java.util.zip.Adler32.updateBytes( )
java.util.zip.CRC32.update( )
java.util.zip.CRC32.updateBytes( )
java.lang.Double.longBitsToDouble( )
java.lang.Float.intBitsToFloat ( )
java.io.FileDescriptor.sync( )
java.io.RandomAccessFile.read( )
java.io.RandomAccessFile.setLength( )
java.lang.Runtime.freeMemory( )
java.lang.Runtime.availableMemory( )sun.misc.Unsafe.monitorExit( )
sun.misc.Unsafe.tryMonitorEnter( )
sun.misc.Unsafe.getLongVolatile( )
sun.misc.Unsafe.allocateMemory( )
```

In one version of the Java Platform, some of the JNI functions are implemented by OS libraries provided with the JVM and/or Java API class libraries, and include some of these files on Linux (or their equivalents on other operating systems like Windows, Solaris, or AIX):

```
libzip.so
librmi.so
libjava.so
libj2gss.so
libjli.so
libj2pcsc.so
libmlib_image.so
libmawt.so
libjaas_unix.so
libhpi.so
```

```
libinstrument.so
libjpeg.so
libhprof.so
libjsound.so
libpulse-java.so
libj2pkcs11.so
libdt_socket.so
libjdwp.so
libunpack.so
libsaproc.so
libfontmanager.so
libsplashscreen.so
libverify.so
libawt.so
libjsig.so
liblcms.so
libjawt.so
libjsoundalsa.so
libnpt.so
libmanagement.so
libattach.so
libjava_crw_demo.so
libmawt.so
libjsig.so
libjvm.so
libnio.so
libnet.so
```

This "redirecting" can be achieved in either one of six methods.

Method 1.1

Redirecting can be achieved by statically modifying the source-code or byte code of the effected Java API classes, prior to their loading and/or execution within a JVM to:
(i) change the method modifiers to remove the "native" modifier,
(ii) insert a small method body to the now-not-native method, which marshals the parameters and invokes the hypervisor-like replacement function with the same or substantially the same parameters, and
(iii) inside this small method body, receive the return parameter (if any) from the replacement hypervisor layer function and return this to the caller of the modified method in accordance with the method declaration.

An example of a before and after replacement in byte code is shown below:
Before:

```
private native void open(java.lang.String) throws
    java.io.FileNotFoundException;
    Exceptions:
        throws java.io.FileNotFoundException
```

After:

```
private void open(java.lang.String) throws
java.io.FileNotFoundException;
    Code:
    Stack=2, Locals=2, Args_size=2
    1:aload_1
    2: invokestatic #102; //Method
com/hypervisor/FileInputStreamProxy.openProxyMethod:(Ljava/lang/String;)
V
    5:return
Exceptions:
    throws java.io.FileNotFoundException
```

In an optional enhancement of Method 1.1 the described static modification may be performed upon individual Java class-files (such as compiled bytecode files saved with the suffix ".class" and optionally stored in JAR file format or similar) or upon individual Java source-files (such as saved with the suffix ".java"), where the post-modified result of Method 1.1 is saved to a persistent or transient storage means (such as hard disk drive) as a new or replaced class-file or source-file (optionally overwriting the original input class-file or source-file).

Method 1.2

The same replacement can be achieved by dynamically modifying the byte-code of the effected Java API classes as or when they are loaded within a JVM, or defined within a JVM, or after they are loaded or defined within a JVM, or executed within a JVM, to:
(i) change the method modifiers to remove the "native" modifier,
(ii) insert a small method body to the now-not-native method, which marshals the parameters and invokes the hypervisor-like replacement function with the same or substantially the same parameters, and
(iii) inside this small method body, receive the return parameter (if any) from the replacement hypervisor layer function and return this to the caller of the modified method in accordance with the method declaration.

Dynamic modification such as described in Method 1.2 can be accomplished with any of various bytecode or classfile instrumentation libraries such as ASM, BCEL, and AOP libraries. An implementation of Method 1.2 may take the form of a "javaagent" (such as loaded with the "-javaagent:" command line option) or a JVMTI agent (such as loaded with the "-agentlib:" or "-agentpath:" command line option), and may make use of the Java Instrumentation APIs of the package java.lang.instrument or the corresponding JVMTI API functions.

Method 1.3

The same replacement can be achieved with source-code modification of the effected Java API classes, as shown below:
Before:

```
public native void open(String name) throws
  FileNotFoundException;
```

After

```
public void open(String name)
  throws FileNotFoundException
{
  com.hypervisor.FileInputStreamProxy.openProxyMethod(name);
}
```

Method 1.4

In another variant, the same replacement effect can be achieved with replacement classes for the effected Java API classes.

In this variant, one or more of the Java API classes may be replaced entirely with alternative versions written for the hypervisor layer and that cooperate closely with the hypervisor-like control layer. This may be desirable when the effected class either has a lot of native methods, and so would require a significant number of the methods of a effected Java API class to be modified (as per methods 1.1-1.3 above), or the class is considered important to the hypervisor-like control layer's security enforcement, that it is preferable or necessary to be replaced completely.

In an embodiment of one such implementation, a non-exhaustive list of replaced classes of the Java API class libraries includes the following:

```
java.nio.HeapShortBuffer
java.nio.IntBuffer
java.nio.FloatBuffer
java.nio.MappedByteBuffer
java.nio.HeapLongBuffer
java.nio.HeapDoubleBuffer
java.nio.HeapMappedByteBuffer
java.nio.HeapByteBuffer
java.nio.HeapIntBuffer
java.nio.DirectFloatBuffer
java.nio.DirectIntBuffer
java.nio.DirectByteBuffer
java.nio.DirectCharBuffer
java.nio.DoubleBuffer
java.nio.DirectLongBuffer
java.nio.ByteBuffer
java.nio.DirectDoubleBuffer
java.nio.CharBuffer
java.nio.Buffer
java.nio.LongBuffer
java.nio.ByteOrder
java.nio.ShortBuffer
java.nio.HeapCharBuffer
java.nio.HeapFloatBuffer
java.nio.DirectShortBuffer
java.util.concurrent.locks.LockSupport
java.lang.ref.WeakReference
java.lang.ref.SoftReference
java.lang.ref.Reference
java.lang.ref.ReferenceQueue
java.lang.ref.PhantomReference
java.lang.ClassLoader
java.lang.System
java.lang.Package
java.lang.reflect.ReflectPermission
java.lang.reflect.Array
java.lang.reflect.Proxy
java.lang.reflect.Method
java.lang.reflect.Constructor
java.lang.reflect.AccessibleObject
java.lang.reflect.ReflectAccess
java.lang.reflect.Field
java.lang.Thread
java.lang.ProcessBuilder
java.lang.Runtime
java.lang.ThreadGroup
java.security.AccessControlContext
java.security.SecureClassLoader
java.security.AccessController
sun.misc.Unsafe
sun.misc.Signal
```

Any replacement class(es) must be implemented with the same public and protected fields, methods, and constructors as the Java API classes they replace. Optionally, they may also implement some or all of the package-private or private fields, methods, and/or constructors as the Java API classes they replace.

Method 1.5

In another variant, the same replacement effect can be achieved by modifying non-native method(s) of the untrusted Java API class libraries which, directly or indirectly, invokes one or more native method(s) that are sought to be redirected to a replacement hypervisor-layer function. When redirection in this manner is to be performed, the source-code or bytecode of the chosen non-native method(s) is modified at any time before loading, during loading, or after loading to:

(i) replace the method body of the non-native method which directly or indirectly invokes the target native method, with a new method body which marshals the parameters and invokes the hypervisor-like replacement function with the same or substantially the same parameters, and (ii) inside the replacement method body, receive the return parameter (if any) from the replacement hypervisor layer function and return this to the caller of the modified method in accordance with the method declaration.

An example of this variant is shown below for the methods bind(int.InetAddress) and bind0(int,InetAddress) in class java.net.PlainDatagramSocketImpl. In the below example code there are two methods: one is the non-native "bind(int,InetAddress)" method which invokes a target native method "bind0(int,InetAddress)" that is sought to be redirected to a replacement hypervisor-layer function. Also shown below is the before and after classfile bytecode of the below "bind(int,InetAddress)" function.

```
/**
 * Binds a datagram socket to a local port.
 */
protected synchronized void bind(int lport, InetAddress laddr)
    throws SocketException {
    bind0(lport, laddr);
    if (laddr.isAnyLocalAddress( )) {
        anyLocalBoundAddr = laddr;
    }
}
    protected synchronized native void bind0(int lport, InetAddress laddr)
    throws SocketException;
```

Before

```
    protected synchronized void bind(int,
java.net.InetAddress) throws java.net.SocketException;
        flags: ACC_PROTECTED, ACC_SYNCHRONIZED
        Code:
            stack=3, locals=3, args_size=3
                0: aload_0
                1: iload_1
                2: aload_2
                3: invokevirtual #21          // Method
bind0:(ILjava/net/InetAddress;)V
                6: aload_2
                7: invokevirtual #22          // Method
java/net/InetAddress.isAnyLocalAddress:( )Z
                10: ifeq          18
                13: aload_0
                14: aload_2
                15: putfield          #12     // Field
anyLocalBoundAddr:Ljava/net/InetAddress;
                18: return
        LineNumberTable:
            line 91: 0
            line 92: 6
            line 93: 13
            line 95: 18
```

```
        Exceptions:
            throws java.net.SocketException
        protected synchronized native void bind0(int,
java.net.InetAddress) throws java.net.SocketException;
        flags: ACC_PROTECTED, ACC_SYNCHRONIZED,
        ACC_NATIVE
        Exceptions:
            throws java.net.SocketException
```

After

```
    protected synchronized void bind (int, java.net.InetAddress) throws
java.net.SocketException;
        flags: ACC_PROTECTED, ACC_SYNCHRONIZED
        Code:
            stack=3, locals=3, args_size=3
                0: iload_1
                1: aload_2
                2: invokestatic #152          // Method
com/hypervisor/DatagramSocketProxy.bindProxyMethod:(
ILjava/net/InetAddress;)V
                5: return
        Exceptions:
            throws java.net.SocketException
        protected synchronized native void bind0(int, java.net.InetAddress)
throws java.net.SocketException;
        flags: ACC_PROTECTED, ACC_SYNCHRONIZED, ACC_NATIVE
        Exceptions:
            throws java.net.SocketException
```

Method 1.6

In another variant, the same replacement effect can be achieved by modifying non-native method(s) of the untrusted Java API class libraries which directly or indirectly invoke one or more target method(s) that are sought to be redirected to a replacement hypervisor-layer function. When redirection in this manner is to be performed, the source-code or bytecode of the chosen non-native method(s) is modified at any time before loading, during loading, or after loading by:

(i) searching for INVOKE instructions (invokestatic, invokevirtual, invokeinterface, invokespecial, invokedynamic) to the target native or non-native method that is sought to be redirected to a replacement hypervisor-layer function, and (ii) for each so-found INVOKE instruction, replacing each instruction with a replacement INVOKE instruction which invokes a proxy function in one or more hypervisor classes which is provided for the purpose of replacing the target method.

A before and after example of this, as applied to classfile bytecode, is shown below.

Before

```
            protected synchronized void bind(int, java.net.InetAddress)
throws java.net.SocketException;
                    flags: ACC_PROTECTED, ACC_SYNCHRONIZED
                    Code:
                    stack=3, locals=3, args_size=3
                            0: aload_0
                            1: iload_1
                            2: aload_2
                            3: invokevirtual  #21              // Method
            bind0:(ILjava/net/InetAddress;)V
                            6: aload_2
                            7: invokevirtual  #22              // Method
            java/net/InetAddress.isAnyLocalAddress:( )Z
                            10: ifeq           18
                            13: aload_0
                            14: aload_2
                            15: putfield       #12             // Field
            anyLocalBoundAddr:Ljava/net/InetAddress;
                            18: return
                    LineNumberTable:
                    line 91: 0
                    line 92: 6
                    line 93: 13
                    line 95: 18
                    Exceptions:
                            throws java.net.SocketException
        protected    synchronized    native    void    bind0(int,
java.net.InetAddress) throws java.net.SocketException;
            flags: ACC_PROTECTED, ACC_SYNCHRONIZED, ACC_NATIVE
            Exceptions:
                    throws java.net.SocketException
```

After

```
                    protected synchronized void bind(int,
        java.net.InetAddress) throws java.net.SocketException;
            flags: ACC_PROTECTED, ACC_SYNCHRONIZED
            Code:
                stack=3, locals=3, args_size=3
                        0: aload_0
                        1: iload_1
                        2: aload_2
                        3: invokestatic   #152            // Method
        com/hypervisor/DatagramSocketProxy.bindProxyMethod:(Ljava/lang/
        Object;IL java/net/InetAddress;)V
                        6: aload_2
                        7: invokevirtual  #22             // Method
        java/net/InetAddress.isAnyLocalAddress:( )Z
                        10: ifeq           18
                        13: aload_0
                        14: aload_2
                        15: putfield       #12            // Field
        anyLocalBoundAddr:Ljava/net/InetAdress;
                        18: return
            LineNumberTable:
                    line 91: 0
                    line 92: 6
                    line 93: 13
                    line 95: 18
            Exceptions:
                    throws java.net.SocketException
            protected synchronized native void bind0(int, java.net.InetAddress)
        throws java.net.SocketException;
            flags: ACC_PROTECTED, ACC_SYNCHRONIZED,
        ACC_NATIVE
            Exceptions:
                    throws java.net.SocketException
```

In addition to, or as an improvement to, Method 1.6, it can be desirable to apply, mutatis mutandis, the modification steps of Method 1.6 to replacing the invocation of one or more target native or non-native methods made by an Application Class. Applying Method 1.6 to Application Class(es), mutatis mutandis, can achieve an equivalent replacement effect such that if an Application Class attempts to invoke a target native or non-native method of the untrusted Java API class libraries, that that invocation will be equivalently redirected to the replacement hypervisor-layer proxy function as described above.

Any single or combined use of the above methods 1.1-1.6 may be desirable in various embodiments of this invention. For example, Method 1.2 might be selected for some of the methods within the untrusted Java API class library, while Method 1.6 might be selected for some other methods within the same untrusted Java API class library.

Subsequent Step(s)

Once some or all of the native methods of the Java API classes have been "redirected" to replacement hypervisor emulation function(s) using one of the above 6 ways, the hypervisor emulation function(s) can undertake a subsequent operation, or step, of quarantine and security-enforcement controls on the untrusted Java API classes.

Method 2.1

An example of such a hypervisor emulation function (the method 'openProxyMethod(String)' of class com.hypervisor.FileInputStreamProxy), with the hypervisor implementing change behaviour to enforce a "less privileged ring" for the second Java API class library is shown below:

```
public static void openProxyMethod(String name)
        throws FileNotFoundException
{
    // do not allow '/etc/passwd' to be opened by
    // this untrusted Java API class library.
    if( name.equals( "/etc/passwd" ) )
    {
        throw new FileNotFoundException(
```

-continued

```
            "This file is not allowed to be opened" );
    }
    // this file is allowed to be opened, so create a new
    // FileInputStreamProxy instance for a new trusted
    // java.io.FileInputStream instance from the trusted Java
    // API class library
    new com.hypervisor.FileInputStreamProxy(
        new java.io.FileInputStream( name ) );
}
```

Method 2.2-Trusted Classes

In a second step of this modification, it is necessary to share some small set of classes from the first trusted Java API class library with the second untrusted Java API class library, so that method calls may take place between the two (via the hypervisor layer) and parameters and return values can be exchanged. In one embodiment of this invention, the small set of classes shared comprises at least the java.lang.Object class.

A list of these classes in another implementation includes:

```
                        java.lang.Object
                        java.lang.Class
                        java.lang.String
                        java.lang.Boolean
                        java.lang.Byte
                        java.lang.Short
                        java.lang.Character
                        java.lang.Integer
                        java.lang.Float
                        java.lang.Long
                        java.lang.Double
                        java.lang.Void
                        java.lang.Throwable
                        java.lang.Error
                        java.lang.Exception
```

Depending on the precise list of "trusted" classes to be shared, access of certain methods or fields or constructors of the "shared" classes by the "untrusted" Java API class library (what we can call "unsafe members") may need to be trapped, or intercepted, or redirected to the hypervisor-layer, so that the hypervisor-layer can perform "protection ring" isolation and security enforcement or other special handling as may be necessary for the hypervisor software to undertake (such as type conversions or parameter/return marshalling).

In embodiments where java.lang.Class is one of the shared classes, the method java.lang.Class.forName(String, boolean,ClassLoader) may be one of the methods that is desirable to be redirected to the hypervisor layer for security control and/or special handling purposes described above.

This redirection cannot be achieved using the Preliminary Step(s) above, and so instead this redirection must be achieved by a different means. Redirection of unsafe members can be achieved by examining the bytecode of every untrusted Java API class file before it is loaded, or sought to be loaded into the JVM, or as it is loaded into the JVM, or as it is about to be executed by the JVM, to do the following:
(a) search for INVOKE instructions (invokestatic, invokevirtual, invokeinterface, invokespecial, invokedynamic), or the GET/PUT instructions (getfield, putfield, getstatic, putstatic), which reference a "unsafe member" which is sought to be replaced or intercepted, and
(b) for each so-found INVOKE instruction or GET/PUT instruction, replace each instruction with a replacement INVOKE instruction which invokes a proxy function in one or more hypervisor classes and which is provided for the purpose of intercepting and/or emulating the member access of the shared class to which it corresponds.

An example of such an untrusted Java API class file being modified in this way is shown below. In the example below, the untrusted Java API class java.sql.DriverManager, in its 'getCallerClass' function, invokes the unsafe member method java.lang.Class.forName(String,boolean,ClassLoader) of the shared class java.lang.Class.

As can be seen below in the AFTER example where java.sql.DriverManager class has been modified at loadtime, or runtime, in accordance with this step 2, the invocation of the unsafe member method "java.lang.Class.forName(String,boolean,ClassLoader)" is replaced with an invocation of a proxy method provided in the hypervisor class(es) for the purpose of security enforcement or special handling as described above.

Before:

```
private static java.lang.Class getCallerClass(java.lang.ClassLoader,
java.lang.String);
    Code:
        Stack=3, Locals=4, Args_size=2
        0:    aconst_null
        1:    astore_2
        2:    aload_1
        3:    iconst_1
        4:    aload_0
        5:    invokestatic    #62; //Method
java/lang/Class.forName:(Ljava/lang/String;ZLjava/lang/
ClassLoader;)Ljava/lang/Class;
        8:    astore_2
        9:    goto    15
        12:   astore_3
        13:   aconst_null
        14:   astore_2
        15:   aload_2
        16:   areturn
    Exception table:
        from    to    target    type
        2       9     12        Class java/lang/Exception
```

After:

```
private static java.lang.Class getCallerClass(java.lang.ClassLoader,
java.lang.String);
    Code:
        Stack=3, Locals=4, Args_size=2
        0:    aconst_null
        1:    astore_2
        2:    aload_1
        3:    iconst_1
        4:    aload_0
        5:    invokestatic    #258; //Method
com/hypervisor/ClassMemberProxyMethods.forNameProxyMethod:
(Ljava/lang/String;ZLjava/lang/ClassLoader;)Ljava/lang/Class;
        8:    astore_2
        9:    goto    15
        12:   astore_3
        13:   aconst_null
        14:   astore_2
        15:   aload_2
        16:   areturn
    Exception table:
        from    to    target    type
        2       9     12        Class java/lang/Exception
```

Here is the hypervisor proxy method provided for the purpose of security control or special handling described above.

```
public static Class forNameProxyMethod( String name, boolean b,
ClassLoader cl )
    throws ClassNotFoundException
{
    // if this untrusted Java API class library is attempting
    // to load any class in the org.hacker_tools.* package,
    // then we disallow this
    if( name.startsWith( "org.hacker_tools." ) )
    {
        throw new ClassNotFoundException( "Classes inside the
org.hacker_tools.* package are not allowed to be loaded by untrusted
Java API classes" );
    }
    // this class is ok to load, so we can call Class.forName( )
    // on the trusted Java API class
    return Class.forName( name, b, cl );
}
```

With one, or a combination, of the above steps undertaken, the next steps implement the security enforcement and quarantine controls that are desirable to be applied to an untrusted or vulnerable Java API class library in order to address the security vulnerabilities and weaknesses of that (or those) Java API class library(ies).

In addition, when operating Application Class(es) on top of the untrusted Java API classlibrary, it may be desirable to apply the redirection of unsafe member modifications of Method 2.2, mutatis mutandis, to the loaded or executed Application Class(es). Applying Method 2.2 to Application Class(es) in this way can then ensure that if an Application Class attempts to access an unsafe member of a Trusted Classes, that that access will be equivalently trapped, intercepted, or redirected to the replacement hypervisor-layer proxy function.

Subsequent Step 2.3

Dynamic Security Control-Denial

The hypervisor proxy methods and the hypervisor proxy classes, can enforce security constraints to deny a range of actions and operations which are not desirable for the untrusted Java API class library to be allowed to perform.

The exact range of security events it is desirable for the hypervisor software to enforce can vary, but common security constraints desirable to be enforced may include:
(i) denying certain classes to be defined, loaded, or looked up,
(ii) denying reading from, or writing to certain files or directories,
(iii) denying the opening of network ports, the opening network connections, the receiving of network connections, or the sending or receiving of network messages or packets,
(iv) denying certain SQL statements to be issued to a database for execution,
(v) denying reflection of certain methods, fields, or constructors,
(vi) denying reading or writing to certain fields of a reflected class or member,
(vii) denying invoking certain methods or constructors of a reflected class or member,
(viii) denying invoking certain methods or constructors, or reading or writing certain fields, of certain classes or packages.

Preferably, the security constraints to be enforced by the hypervisor software are specified by means of a human-readable "rules file" stored on a hard disk or equivalent storage means, which specifies actions or operations which are undesirable for the "untrusted" Java API class library and/or application class(es) to execute, and for which the hyerpvisor-layer is to deny or block.

An example of such a rule file, specifying actions or operations to deny, is shown below:

```
# MAC rule for denying process forking
procfork:level:none:deny:warn
# Virtual patch rule for Apache Struts2 vulnerability
reflect:class:com.opensymphony.xwork2.ognl.
SecurityMemberAccess:method:set
AllowStaticMethodAccess(Z)V:deny:warn
# Deny reflection of sun.misc.Unsafe class
reflect:class:sun.misc.Unsafe:method:theUnsafe( )Lsun/misc/
Unsafe;:deny:warn
# Example file rule
file:read:/etc/:deny:warn
# Example network rule
network:connect:www.google.com::deny:warn
# Example classlink rule to deny linking to sun.misc.Unsafe class
classlink:class:sun.misc.Unsafe:deny:warn
```

Subsequent Step 2.4

Dynamic Security-Audit

In an optional further step, the proxy methods/classes of the hypervisor software can, in addition to enforcing security constraints, or as an alternative to it, perform logging to a security log file maintained by the hypervisor software for that purpose, of actions or operations undertaken by the untrusted Java API class library or application class(es) operating on top of the untrusted Java API class library that may be of interest to an administrator as an indicator of security vulnerabilities or exploit attempts.

In this way, alert notices of suspicious or malicious operations attempted to be performed by the untrusted Java API class library can be logged and examined at a later time by the administrator to determine whether the actions performed are indeed suspicious or malicious, or not. This log file can then be used to audit untrusted applications and untrusted Java API class library versions, to thereby gain valuable intelligence on vulnerabilities, exploits, and attack stratagems of the executing untrusted application(s) and library(ies).

Preferably, the suspicious or potentially malicious actions or operations desirable to be logged to the security log file are specified by means of a human-readable "rules file" stored on a hard disk or equivalent storage means, which specifies actions or operations for which the hypervisor is allow but to also log an alert or other notice of such action/operation occurring to the security log file provided for that purpose.

An example of such a rule file, specifying actions or operations to log the occurrence of, is shown below:

```
# Example file rule
file.read:/etc/passwd:allow:alert
# Example networks rules
network:accept:localhost::allow:alert
```

The use of the term "OS libraries" is to be understood to include the operating-system dependent libraries provided by, or with, a JVM or the Java API class libraries, and which are written in one or more non-Java languages and which interact with the underlying operating system and computer memory directly.

Additional Aspects

There are embodiments where the "trusted" Java API class library, and the "untrusted" Java API class library, are different versions of the Java SE class libraries:

EXAMPLE 1

Trusted being a Version of Java SE 6, and Untrusted being a Version of Java SE 5

EXAMPLE 2

Trusted being Java SE 1.6.0_43 and untrusted being Java SE 1.6.0_24

By being able to operate an untrusted older and vulnerable version of the Java API class library on top of a trusted more recent and less vulnerable version of the Java API class library, the hypervisor software can provide the significant benefit of increasing the security of old or legacy application classes (and the old Java API class library upon which they are written to depend) without requiring those application classes to be re-written or modified in order to use a new and less vulnerable Java API class library version. This is a significant operational benefit for administrators who are operating old or legacy application programs, as it allows them to make their old applications more secure and less vulnerable without having to change the source-code or upgrade the Java API class library version that the old application relies on.

There are also embodiments where the trusted Java API class library, and the untrusted Java API class library, operate from different JRE and/or JDK directories with different "rt.jar", "jsse.jar". "jce.jar" classfile archives.

There are embodiments where the untrusted Java API class library does not load any native libraries, or load any class with one or more native methods which loads a native library.

In addition, there are embodiments where the hypervisor-layer "enforces security constraints" on certain operations attempted to be performed by the untrusted Java API class library.

Furthermore, there are embodiments where these enforced security constraints include denying certain classes to be defined, loaded, or looked up.

Similarly, there are embodiments where these enforced security constraints include denying reading from, or writing to, certain files or directories.

In addition, there are embodiments where these enforced security constraints include denying opening network ports, opening network connection, receiving network connections, or sending or receiving network messages or packets.

There are also embodiments where these enforced security constraints include logging to a security log file maintained by the hypervisor layer for that purpose, generating alert notices relating to suspicious or malicious operations which have been attempted to be performed by the untrusted Java API class library.

Also included are embodiments where these enforced security constraints include denying certain reflection or introspection operations.

Still further, there are embodiments where more than one untrusted Java API class library is operated simultaneously on top of a single trusted Java API class library.

The foregoing describes only some embodiments of the present invention and modifications, obvious to those skilled in the computer programming arts, can be made thereto without departing from the scope of the present invention.

The term "comprising" (and its grammatical variations) as used herein is used in the inclusive sense of "including" or "having" and not in the exclusive sense of "consisting only of".

The invention claimed is:

1. A method of operating one or more untrusted application programs on a JAVA virtual machine (JVM) in an enhanced security mode, said JAVA virtual machine comprising a host computer having a memory and functional assets onto which is installed a JVM layer and a single, first, lower, trusted JAVA Application Programming Interface (API) library, said method comprising;
   running a hypervisor software layer on said first, lower, trusted JAVA API library;
   running at least one second, upper, untrusted JAVA API library on said hypervisor software layer;
   at or before runtime, modifying the code of said at least one second, upper, untrusted JAVA API library to call said hypervisor software layer instead of said JVM to create at least one silo, said at least one silo extending between said host computer and a corresponding one of said at least one second, upper, untrusted JAVA API library; and
   operating said hypervisor software layer to only permit communication between said at least one second, upper, untrusted JAVA API library and a corresponding portion of the memory and functional assets of said host computer,
   wherein each of said least one second, upper, untrusted JAVA API library cannot communicate with all of said host computer memory or all of said host computer functional assets.

2. The method as claimed in claim 1 wherein said hypervisor software layer is the only application running on said first, lower, trusted JAVA API library.

3. The method as claimed in claim 2 wherein said first, lower, trusted JAVA API library has a Java language version which is different from the Java language version of said second, upper, untrusted JAVA API library.

4. The method as claimed in claim 3 wherein said first, lower, trusted JAVA API library has a Java language version which is later than the Java language version of said at least one second, upper, untrusted JAVA API library wherein said at least second, upper, untrusted JAVA API library comprises legacy application programs.

5. A computer architecture to be hosted by a host computer having memory and functional assets to form a JAVA Virtual Machine having enhanced security, said computer architecture comprising
   a single, first, trusted JAVA Application Program Interface (API) library above a JVM,
   a hypervisor software layer above said first trusted JAVA API library, and
   at least one second, untrusted JAVA API library on said hypervisor layer, the code of said at least one second, upper, untrusted JAVA API library being modified at or before runtime to call said hypervisor software layer instead of said JVM to create at least one silo, said at least one silo extending between said host computer and a corresponding one of said at least one second, upper, untrusted JAVA API library;
   wherein said hypervisor software layer only permits communication between said at least one second, upper, untrusted JAVA API library and a corresponding portion of said memory and functional assets of said host computer, and wherein each of said at least one second, upper, untrusted JAVA API library cannot communicate with all of said host computer memory or all of said host computer functional assets.

6. The computer architecture as claimed in claim 5 wherein said hypervisor software layer is the only application running on said first, lower, trusted JAVA API library.

7. The computer architecture as claimed in claim 6 wherein said first, lower, trusted JAVA API library has a Java language version which is different from the Java language version of said at least one second, upper, untrusted JAVA API libraries.

8. The computer architecture as claimed in claim 7 wherein said first, lower, trusted JAVA API library has a Java language version which is later than the Java language version of said at least one second, upper, untrusted JAVA API library wherein said at least one second, upper, untrusted JAVA API library comprises legacy application programs.

9. A physical computer program product comprising a non-transitory computer readable medium having stored thereon instructions for causing one or more processing units to execute the method as claimed in claim 1.

* * * * *